US008769607B1

(12) United States Patent
Jerdonek et al.

(10) Patent No.: US 8,769,607 B1
(45) Date of Patent: Jul. 1, 2014

(54) SYSTEMS AND METHODS FOR EVALUATING A PASSWORD POLICY (75) Inventors: Robert A. Jerdonek, Santa Clara, CA (US); Christopher C. Chung, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 379 days.

(21) Appl. No.: 13/014,406

(22) Filed: Jan. 26, 2011

(51) Int. Cl.
G06F 17/00 (2006.01)

(52) U.S. Cl.
USPC .................. 726/1; 726/2; 726/3; 726/4; 726/6

(58) Field of Classification Search
CPC ... G06F 21/6218; G06F 21/604; G06F 21/31; G06F 21/083; H04L 63/20; H04L 63/102; H04L 63/0227; H04L 63/08; H04L 63/0083; H04L 63/0815; H04L 63/0428
USPC ............................................. 726/1, 2, 3, 4, 6
See application file for complete search history.

(56) References Cited

U.S. PATENT DOCUMENTS

| 5,029,526 | A | * | 7/1991 | Kipphan et al. | 101/350.1 |
|---|---|---|---|---|---|
| 5,448,638 | A | * | 9/1995 | Johnson et al. | 705/72 |
| 6,941,465 | B1 | * | 9/2005 | Palekar et al. | 726/1 |
| 7,246,370 | B2 | * | 7/2007 | Valente et al. | 726/1 |
| 7,930,727 | B1 | * | 4/2011 | Baize et al. | 726/1 |
| 7,934,101 | B2 | * | 4/2011 | Stieglitz et al. | 713/183 |
| 8,332,918 | B2 | * | 12/2012 | Vedula et al. | 726/6 |
| 8,443,426 | B2 | * | 5/2013 | Mattsson | 726/6 |
| 2002/0026538 | A1 | * | 2/2002 | Takeo et al. | 710/5 |
| 2004/0064742 | A1 | * | 4/2004 | Excoffier et al. | 713/202 |
| 2004/0220878 | A1 | * | 11/2004 | Lao et al. | 705/51 |
| 2006/0005229 | A1 | * | 1/2006 | Palekar et al. | 726/1 |
| 2007/0014399 | A1 | * | 1/2007 | Scheidt et al. | 380/44 |
| 2007/0106965 | A1 | * | 5/2007 | Ohta et al. | 716/2 |
| 2007/0130463 | A1 | * | 6/2007 | Law et al. | 713/168 |
| 2007/0186106 | A1 | * | 8/2007 | Ting et al. | 713/168 |
| 2008/0115223 | A1 | * | 5/2008 | Morris et al. | 726/27 |
| 2008/0155680 | A1 | * | 6/2008 | Guyot et al. | 726/17 |
| 2008/0216170 | A1 | * | 9/2008 | Sanai et al. | 726/18 |
| 2009/0150971 | A1 | * | 6/2009 | Vedula et al. | 726/1 |
| 2009/0178105 | A1 | * | 7/2009 | Feng et al. | 726/1 |
| 2009/0178106 | A1 | * | 7/2009 | Feng et al. | 726/1 |
| 2009/0205016 | A1 | * | 8/2009 | Milas | 726/1 |

(Continued)

OTHER PUBLICATIONS

Chiasson et al. "A Usability Study and Critique of Two Password Managers", Proceedings of the 15th conference on USENIX Security Symposium, p. 1-16, Jul. 31-Aug. 4, 2006, Vancouver, B.C., Canada.*

(Continued)

Primary Examiner — Jason K. Gee
Assistant Examiner — Sanchit Sarker
(74) Attorney, Agent, or Firm — Vista IP Law Group LLP (57) ABSTRACT Systems, methods and articles of manufacture for evaluating a password policy are disclosed. The password evaluation system receives password policy data regarding a password policy, including a password constraint. The system analyzes the password policy data to determine a usability index and a password strength index for the password policy, and also determines a usability index and password strength index for a plurality of modified password policies having password constraints different from the password policy. The system then provides a graphical representation of the usability index and the password strength for the password policy and the modified password policies, thereby allowing a password designer to optimize the tradeoffs between usability and security of a password policy.

17 Claims, 4 Drawing Sheets

(56) References Cited

U.S. PATENT DOCUMENTS

| | | | |
|---|---|---|---|
| 2010/0257576 A1* | 10/2010 | Valente et al. | 726/1 |
| 2011/0154443 A1* | 6/2011 | Thakur et al. | 726/3 |
| 2011/0231895 A1* | 9/2011 | Tovar | 726/1 |
| 2011/0239267 A1* | 9/2011 | Lyne et al. | 726/1 |
| 2012/0259665 A1* | 10/2012 | Pandhi et al. | 705/4 |

OTHER PUBLICATIONS

Keith el al. "The usability of passphrases for authentication: An empirical field study", International Journal of Human-Computer Studies, p. 17-28, vol. 65, Issue 1, Jan. 2007.*

Chiasson et al. "A Usability Study and Critique of Two Password Managers", Proceedings of the 15th conference on USENIX Security Symposium, p. 1-16, Jul. 31-Aug. 4, 2006, Vancouver, B.C., Canada.

Dell'Amico et al. "Measuring Password Strength: An Empirical Analysis", Institut Eurecom; Jul. 20, 2009, 15 pages.*

Dell'Amico et al. "Measuring Password Strength: An Empirical Analysis", Institut Eurecom; Jul. 20, 2009, 15 pages.*

Burr, et al. "Electronic Authentication Guide: Recommendations of the National Institute of Standards and Technology", NIST Special Publication 800-63 Version 1.0.2, Apr. 2006 Webite: http://csrc.nist.gov/publications/nistpubs/800-63/SP800-63V1_0_2.pdf (64 pages).

Grimes, Roger A., "Test the strength of your password policy", InfoWorld, May 22, 2009 (4 pages) Website: http://www.infoworld.com/d/security-central/test-strength-your-password-policy-437.

Grimes, Roger A., "Password Guessing Calculator v.0.96." Microsoft ACE Team (5 pages) Website: http://www.infoworld.com/sites/all/themes/ifw/downloads/passwordcalc096.zip as of Jan. 26, 2011.

Stross, Randall "A Strong Password Isn't the Strongest Security", The New York Times, Sep. 4, 2010 (3 pages) Website: http://www.nytimes.com/2010/09/05/business/05digi.html?scp=1&sq=password&st=cse.

Florencio, et al., "Where Do Security Policies Come From?", Microsoft Research, 2010 (14 pages) Link: http://research.microsoft.com/pubs/132623/WhereDoSecurityPoliciesComeFrom.pdf.

* cited by examiner

SYSTEMS AND METHODS FOR EVALUATING A PASSWORD POLICY

BACKGROUND

The invention relates to passwords for authenticating users; and more particularly, to new systems and methods for evaluating the effectiveness of password policies.

Passwords are used for authenticating the users of numerous types of accounts, proving identity and gaining access to protected resources. For example, many computer software applications and systems and most online accounts require a username and a password to gain access to the online account. A typical computer user may use passwords for many purposes, such as logging in to computer accounts, retrieving e-mail from servers, accessing programs, databases, networks, web sites, and even reading the morning newspaper online.

Despite the name, passwords are not necessarily actual words, but may be any reproducible combination of characters, including letters, numbers, symbols, or the like. These different characters sets are referred to as character types. Thus, letters, numbers and symbols each represent different character types. Passwords may even be formed from multiple words, which may more accurately be called a passphrase. The term passcode is sometimes used when the secret information is purely numeric, such as the personal identification number (PIN) commonly used for ATM access. As used herein, the term password includes passphrases, passcodes, and any reproducible combination of characters which are used to gain access and/or prove identity.

Typically, a user is asked to choose a password which meets certain criteria by setting constraints on the passwords that are allowed, such as the number of characters, the types of characters, and sometimes restricted words and/or characters. These criteria are referred to as a "password policy." The password policy governs which passwords are allowed or disallowed for a particular application. For instance, the policy may have constraints such as requiring that the password has a minimum of 8 characters, and that the password contains at least one uppercase letter and at least one number.

The password constraints of a password policy are generally chosen so as to establish a certain minimum level of security for the passwords allowed by an application. One measure of the level of security afforded by a password policy is the password "strength," which is a measure of the resistance of a password to being compromised by an unauthorized entity, commonly referred to as an "attacker." Some of the factors affecting password strength are the minimum length and the password complexity. The password complexity may include such constraints as the composition of the character set, requirements to utilize certain combinations of character types, and restrictions on commonly used words and character combinations. In general, increased password complexity results in a stronger password and a more secure authentication system. As discussed in more detail below, if passwords are not complex, they tend to be easier for attackers to guess. If the passwords are more complex, it is more difficult for an attacker to guess a user's password.

The strength of a password is commonly measured as the uncertainty in the value of a password, and this uncertainty has been commonly termed the "entropy" of a password. The entropy of passwords is conventionally expressed in bits. Thus, if a password of k bits is chosen at random, there are $2^k$ possible values and the password is considered to have k bits of entropy. For instance, if a password of length l is randomly chosen from an alphabet of b characters, then the entropy of the password is $b^l$, or expressed in bits, the entropy is given by the following formula:

$$\text{Entropy} = \log_2(b^l)$$

As an example, a password randomly composed of 8 characters chosen from the English alphabet of 26 letters has an entropy of $26^8 \approx 2.1 \times 10^{11}$, or about 37.6 bits of entropy. For randomly chosen passwords, the entropy of a password is simply the number of possible combinations of characters. Since password policies usually specify a constraint on the minimum number of characters, this calculation would measure the minimum entropy of the password policy, because users could choose passwords having more than the minimum number of characters. However, since users tend to gravitate toward the weakest passwords allowed by a password policy, this calculation tends to be representative of the strength of the password policy. Moreover, as discussed below, other factors are considered in modeling password entropy which tends to take in to account this possible inaccuracy.

The actual entropy of passwords chosen by users according to a password policy tends to be much lower than this theoretical "random" entropy because they are not chosen at random and they will not have a uniform random distribution. Still, by adding complexity constraints on passwords, the randomness of the passwords can be increased, and therefore the entropy and strength of the password policy is increased. For example, if a password policy requires that a password have a minimum of 8 characters, and must contain at least one letter and one number, the randomness of the possible passwords increases because it eliminates many common passwords that are easy for an attacker to guess, even though the constraint reduces the allowed set of passwords.

There are several published theories and models for determining password entropy (a measure of the strength of a password), which take into account many of the non-random factors of user selected passwords, such as adding complexity requirements. For example, the National Institute of Standards and Technology, Electronic Authentication Guideline, William E. Burr, Donna F. Dodson and W. Timothy Polk, published April, 2006, includes a detailed analysis and modeling of electronic authentication and password strength (the "NIST model" for password entropy/strength). Other password entropy models include one developed by C. E. Shannon (the "Shannon model"), a language entropy researcher, and one developed by Dr. Jesper Johannson, an author and researcher on the subject of passwords (the "Johansson model"), both of which are accessible on the internet. Thus, there are several available techniques for assessing the strength of a password system.

However, adding complexity to a password policy makes it difficult for a user to choose a compliant password and difficult for the user to remember his or her password. The constraints may restrict a user from choosing an easy to remember password, or a password that the user is using for other applications. The user may have to make multiple attempts to find a compliant password, especially where the complexity constraint restricts commonly used words and passwords. Multiple failed attempts can discourage the user from using the application at all, which can be very damaging to the business of a commercial website such as a online retailers and advertising supported websites, where every login event is a revenue opportunity.

Thus, the designers of the password policy must make a tradeoff between security and ease-of-use. Typically, the designers of the policy choose the policy in an ad-hoc manner. They will often look at industry best practices and use their own intuition to choose a password policy that seems secure, yet does not adversely impact the ease of use for the end users. There is currently no technique or tool to quantitatively evaluate the tradeoff between security and ease-of-use of a password policy.

SUMMARY

The present invention is directed to methods and systems for evaluating a password policy and providing an analytical representation of the impact of password policy changes on both security, in terms of password strength, and password usability. In this way, a password policy designer can evaluate proposed password policy constraints and determine which set of constraints result in the maximum security benefit, while minimizing the negative impact on usability from added constraints.

Accordingly, one embodiment of the present invention is directed to a method for evaluating a password policy comprising the step of receiving at an evaluation system, from a user, password policy data regarding a password policy, including a password constraint. The evaluation system is typically a computerized system including hardware and software configured to implement the method, as described in more detail below. The user can be any person, entity or system, which inputs data regarding the password policy to the evaluation system.

The evaluation system analyzes the data regarding the password policy to determine a usability index and a password strength index for the password policy. For instance, the system may utilize a usability index database to determine the usability index for the password policy, such as a usability index on a scale from 1 to 100, with 0 being a low usability score, and 100 being a high usability score. The evaluation system determines a password strength index for the password policy. As described above, there are several known models for determining password strength. The password strength may be determined in any suitable measure, such as entropy.

The evaluation system also determines a usability index and password strength index for a plurality of modified password policies having password constraints different from the password policy received from the user. This allows the user to determine an effect of changes to the password policy on the usability index and password strength index. For instance, the evaluation system may analyze and determine the usability index and password strength index for policies adding or modifying the password constraints from those received by the user, such as adding additional complexity requirements or increasing the minimum number of characters. The evaluation system uses modeling and database information to determine the usability index and password strength index for these modified password policies.

Next, the evaluation system provides to the user a graphical representation of the usability index and the password strength index for the password policy. The graphical representation may be any suitable representation, such as a two dimensional chart having the usability index along one axis, and the password strength index along a second axis. The data point for the password policy received from the user, as well as the data points for the password policies having various changes can be plotted on the chart.

The graphical representation can show where the changes in the password policy increase the password strength index, while having an acceptable decrease in the usability index. The graphical representation may also show where additional password constraints only minimally increase the password strength index, or where they severely decrease the usability index. In this way, a password policy designer can quickly and easily see the usability index and password strength for the entered password policy, and the effect of changes to the password policy on these indexes. The password policy designer can then find the minimum constraints which provide the maximum benefit on security of the password protected application, while maintaining a desirable level of usability.

In another embodiment, the evaluation system may create a curve of the usability index against the password strength index for the password policy received from the user, and the modified password policies. The evaluation system may determine an inflection point on the curve where a change in the password strength has an increased effect on the usability index. In other words, the inflection point is a point on the curve where the slope changes such that a unit change in the password strength has an increasing change on the usability index. This inflection point indicates a point of diminishing return, where unit increases in complexity (and resulting decreases in usability), have a diminished corresponding increase in password strength (security). The evaluation system can then provide one or more recommended password policy constraints based on the location of the inflection point.

Another embodiment of the present invention is directed to an evaluation system for implementing the above-described methods of evaluating a password policy. The system may comprise one or more computers, servers and/or website servers hosting a web application for accessing the system over the internet. The system is configured to perform the following steps: (a) receiving from a user, data regarding a password policy, including a password constraint; (b) analyzing the password policy data to determine a usability index and a password strength index for the password policy; (c) determining a usability index and password strength index for a plurality of modified password policies having password constraints different from the password policy; and (d) providing to the user, a graphical representation of the usability index and the password strength for the user defined password policy and the modified password policies.

Another embodiment is directed to an article of manufacture comprising a computer program carrier readable by a computer and embodying instructions executable by the computer to program a computer system to perform the steps of at least one of the method embodiments for evaluating a password policy including: (a) receiving from a user, data regarding a password policy, including a password constraint; (b) analyzing the password policy data to determine a usability index and a password strength index for the password policy; (c) determining a usability index and password strength index for a plurality of modified password policies having password constraints different from the password policy; and (d) providing to the user, a graphical representation of the usability index and the password strength for the password policy and the modified password policies.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION OF ILLUSTRATED EMBODIMENTS

Embodiments of the present invention are directed to systems, methods and apparatus for evaluating a password policy. In general, the invention comprises a password evaluation system including one or more computers, servers and/or website servers and software for implementing a method of evaluation a password policy. The password evaluation system receives password policy data regarding a password policy, including a password constraint, such as the minimum number of characters and the character set(s) for the password. The system analyzes the password policy data to determine a usability index and a password strength index for the password policy, and also determines a usability index and password strength index for a plurality of modified password policies having password constraints different from the password policy. The system then provides a graphical representation of the usability index and the password strength for the password policy and the modified password policies, thereby allowing a password a password designer to optimize the tradeoffs between usability and security of a password policy.

Figure 1:
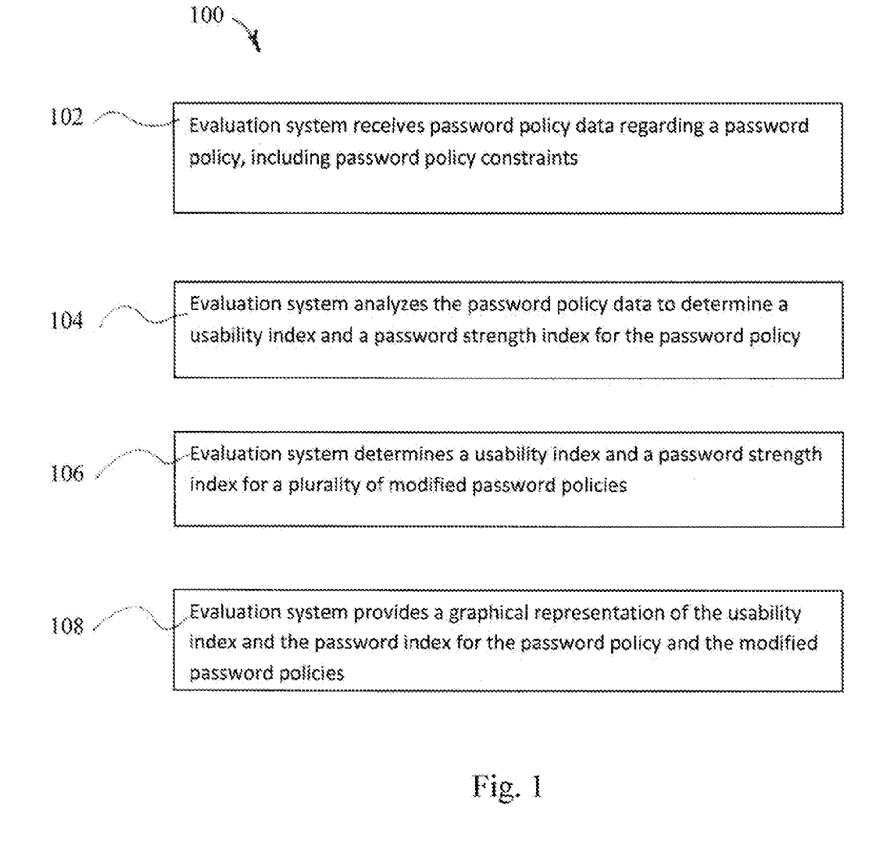
FIG. 1 is a flow chart of a method for evaluating a password policy according to one embodiment of the present invention.

Referring to FIG. 1, in one embodiment, a method 100 for evaluating a password policy is shown. The method 100 comprises a step 102 in which an evaluation system receives from a user, password policy data regarding a password policy, including one or more password constraints for the password policy. As described in more detail below, the evaluation system is a computerized system including one or more computers and associated hardware and software configured and programmed to implement the method 100. The evaluation system can receive the password policy data in any suitable manner, including, for example, data input locally into the system, or through a communication network.

The password policy data may include any data regarding a password policy which may be useful in analyzing the password policy, including password constraints, and application data. The various password constraints are described above, and may include the number of characters in the password (e.g. minimum, maximum, set number), the classes or types of character sets allowed, and other password complexity requirements. The classes of character sets refers to such classes as letters of the alphabet, upper case letters, lower case letter, numbers, symbols, and the like.

The password complexity refers to requirements to utilize certain combinations of characters or positional restrictions, or to avoid certain restricted words, restricted characters, and restricted combinations. The following is a non-limiting list of examples of password complexity constraints: (a) at least one number and one letter (i.e. at least two character classes); (b) at least one symbol; (c) at least one number, one letter and one symbol (i.e. at least three character classes); (d) at least one number between the first and last character (a positional constraint); (e) no symbols (a character class restriction); only letters and numbers (a character class restriction); (f) cannot contain the user's name, or other personal information (restricted words and/or numbers); and (g) cannot be a common word or password. As discussed above, these types of password complexity constraints increase the randomness of passwords under a password policy, and as a result, increase the entropy and security of the password policy.

The password policy data may also include data regarding the application and/or use for the password. As some examples, the application data may include the type of password input typically used by the password user (e.g. a computer, a mobile phone, a number keypad, a full keyboard, etc.), type of industry for the application, the number of users, the value of the assets protected by the password, the level of the frequency of attack on the password protected application, etc. For instance, if the password is for a website account, the application data may include, without limitation, the type of website, such as consumer retail, financial retail, consumer education, public government, private education, private government, the number of users of the website, the type of users (consumer, internal user, scientist, student, level of education, etc.), the value of the accounts, information and resources protected by the password, the level of privacy required by the website, and the frequency of attacks on the website. Some of the application data may be expressed as levels or degrees, such as high, medium or low, large, medium or small, or as more specific data such as numbers.

At step 104, the evaluation system analyzes the password policy data to determine a usability index and a password strength index for the password policy. As described in more detail below, the usability index may be determined using models and/or empirical data compiled, stored and programmed into the evaluation system. The password strength index may be determined using the models described above, such as the NIST model, the Johansson model, or the Shannon model, or some combination of two or more of these models, as described below.

The usability index is a measure of the ease of use of the passwords allowed by the password policy. For instance, the usability index may take into account the ease or difficulty of choosing a compliant password, the ability of the user to use the same password on multiple applications (also referred to as "password re-use"), the ease or difficulty of remembering the password, and the ease or difficulty of correctly inputting the password into the input device. Thus, the evaluation system utilizes the password constraints, and relevant application data, such as the type of password input device, the type of application, the type of password user, and the like, to determine a usability index.

The evaluation system may use various models and metrics to determine various factors related to the usability of a password which complies with a specified password policy. These factors can then be normalized and combined to determine an overall usability index for the password policy. For instance, the evaluation system may use data and/or models produced from empirical usability studies. Such studies may entail testing of samples of users and performing tests, such as testing various password constraints for factors such as: how long it takes users to choose a compliant password; the number of failed attempts before a compliant password is chosen; how long the users can remember the chosen password; and other factors related to usability. The users may be chosen based on their backgrounds as typical users for specific applications, such as average consumers for consumer retail websites, users having finance background for financial websites, scientists for science websites, students at a particular level of education for educational websites, government employees for government websites, etc.

Alternatively, or in addition to, the models based on empirical studies, quantitative methods may also be used to model the usability factors such as how long it takes users to choose a compliant password; the number of failed attempts before a compliant password is chosen; how long the users can remember the chosen password; and other factors related to usability. The quantitative methods may be used to determine the usability factors with or without reference to empirical data, and/or by extrapolating usability factors from empirical data.

The usability factor related to the ability of the user to re-use the password across multiple applications can be determined by comparing the password policy to a model of the policies of other applications, such as other websites, software applications, and password protected accounts. Lists of these password policies can be compiled, or are accessible from available sources. The password policies can then be used to create a model from which the ability to re-use a password compliant with a specific password policy can be determined.

The type of input device is also a factor that affects the usability of the password. For instance, if the input device is a full keyboard, it is relatively easy to utilize any of the 94 characters on a standard English keyboard in a password policy. However, many mobile phones have only a numerical keyboard, and letters are more difficult to input. Even mobile phones, or smartphones, with full keyboards are small-sized and compressed, making it more difficult to input letters and/or symbols. Similarly, an ATM keyboard may also have only a numerical keyboard and a few other input keys. Therefore, if the most common input device for a password policy is a mobile phone, a constraint requiring letters and/or symbols will have a higher negative impact on usability than if the input device is a computer keyboard. And a requirement for symbols on a mobile phone may have an even higher negative impact on the usability.

Thus, as a non-limiting example, the evaluation system may analyze the following six factors to determine usability:

First factor: how long it takes to choose a compliant password;

Second factor: how many tries it takes to choose a compliant password;

Third factor: how difficult it a compliant password is to memorize;

Fourth factor: ability to re-use the password on other applications;

Fifth factor: the type of input device;

Sixth factor: the type of user.

The evaluation system may determine a score or index for one or more of these factors, as some of the factors may not apply in all cases. There may not be data for a particular factor, or the factor may not be relevant to a particular password policy being evaluated by the method 100. Then, the evaluation system uses a usability algorithm to combine all of the factors into an overall usability index for the password policy.

At step 104, the evaluation system also determines a password strength index for the password policy. As described above, the password strength index is a measure of the resistance of a password to being compromised by an attacker. Passwords can be attacked in several ways, such as brute-force guessing attacks, or more rational based guessing programs. There are several available models for determining password strength based upon the password constraints, including the number of characters, the character set(s), and password complexity. As explained above, password complexity includes constraints such as the composition of the character sets, requirements to utilize certain combinations of character types, and restrictions on commonly used words and character combinations. The evaluation system uses the data related to the password policy, including the password constraints, to calculate a password strength index. The evaluation system can use any of the known models described above, such as the NIST model, the Johansson model, or the Shannon model, or some combination of two or more of these models, as described below, or a custom developed model. The evaluation system can determine the password strength index in any suitable units, although bits of entropy are the most common units used by password strength models. Of course, the password strength index can be normalized to any convenient scale for facilitating the evaluation of the password policy, especially the step 108 of providing a graphical representation of the usability index and the password index for the password policy and the modified password policies.

At step 106, the evaluation system determines a usability index and a password strength index for a plurality of modified password policies. The modified password policies include password constraints different from the password constraints of the password policy received from a user. For example, if the password policy received from the user has a password length of 6 characters consisting only of letters, and no complexity requirements, then the modified password policies may be:

First modified password policy: 8 characters consisting of letters and no complexity requirements;

Second modified password policy: 6 characters consisting of 3 character classes, and a complexity requirement of at least one character from each character class;

Third modified password policy: 8 characters consisting of consisting of 3 character classes, and a complexity requirement of at least one character from each character class;

Fourth modified password policy: 6 characters consisting of 3 character classes, a first complexity requirement of at least one character from each character class, and a second complexity requirement of no common words or patterns (e.g. 123456).

At step 106, the evaluation system determines a usability index and password strength index for each of the modified password policies. The evaluation system may use the same methods described above for determining the usability index and password strength index for the user-defined password policy to determine the usability index and password strength index of the modified password policies.

Figure 2:
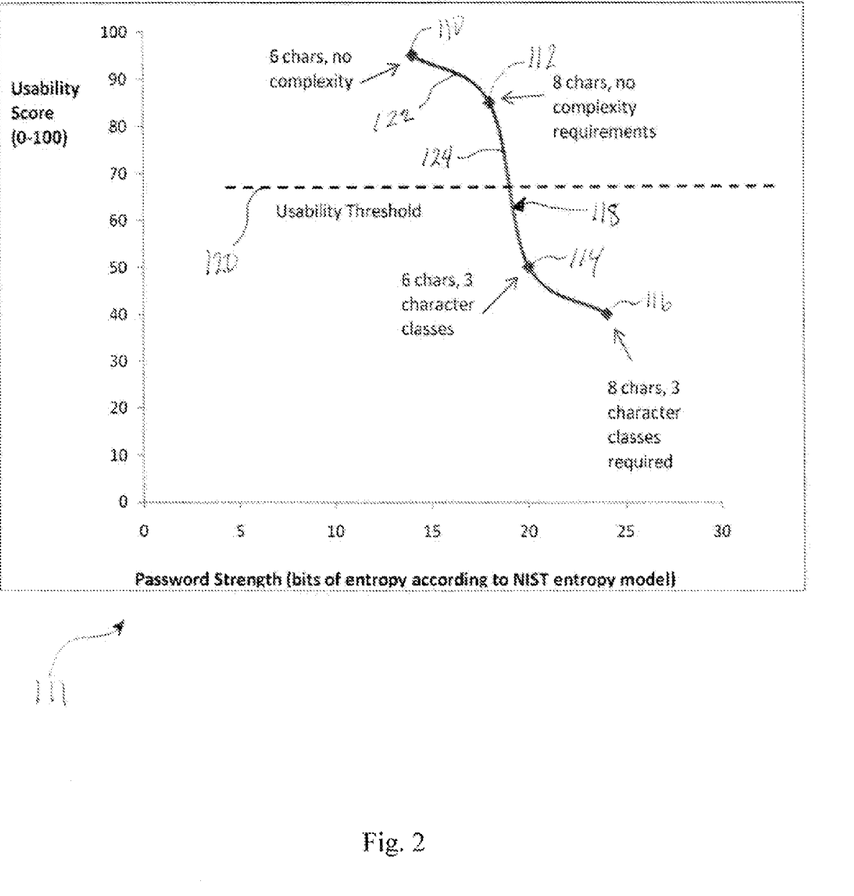
FIG. 2 is an example of a graphical representation of the usability index and password strength index for a plurality of password policies according to one embodiment of the present invention.

At step 108, the evaluation system provides a graphical representation of the usability index and password strength index for the user defined password policy and the modified password policies. Turning to FIG. 2, in one example, the graphical representation 111 may be a graph of the usability index versus the password strength for each of the user defined password policy and the modified password policies. The graph of FIG. 2 has a horizontal axis for the password strength index, in this case, in units of bits of entropy according to the NIST entropy model, and a vertical axis for the usability index on a scale from 0 to 100. A higher usability index score indicates increased usability (easier to use), and a lower score indicates less usability (more difficult to use). Each of the password policies is charted on the graph for at the point of its password strength index on the horizontal axis and its usability index on the vertical axis. In this example shown in FIG. 2, there are the points for the user defined password policy 110, a first modified password policy 112, a second modified password policy 114, and a third modified password policy 116. In addition, a best fit curve 118 may be drawn though each of the points.

Also, as shown in FIG. 2, a usability threshold line 120 may be included on the graphical representation 111. The usability threshold is the minimum usability index desired by the user and/or recommended by the evaluation system. The usability threshold line 120 may be a user defined threshold based on the characteristics of the application and other password policy aspects. For example, the use may define a minimum usability index based on the usability of password policies of other similar applications. Alternatively, the evaluation system can determine the usability threshold based on an analysis using the data regarding the password policy, as described above. For instance, for a commercial retail website, the evaluation system may recommend a high usability index because usability is a driving factor for such websites. On the other hand, the evaluation system may recommend a lower usability index for education or government websites because these types of applications usually are not competing for users and accounts, as the users typically have only one choice for the application. The usability threshold line may be moved by the user upon reviewing the graphical representation 111. For instance, the user may decide that the threshold should be higher or lower based upon the information provided by the graphical representation.

The graphical representation 111 clearly shows the user (such as a password policy designer) where the most benefit in password strength is derived with the least cost in terms of usability. The first segment 122 of the line 118 is very horizontal, which shows that there is not much drop in usability as the password strength is increased going from the user defined password policy 110 to the first modified password policy 112. In contrast, the second segment 124 of line 118 is nearly vertical, which indicates a severe drop in usability as the password strength is increased going from the first modified password policy 112 to the second modified password policy 114. The line 118 clearly shows the user the effect of modifying the password policy in various ways on usability and password strength. It can be seen that the points on the curve 118 where the slope changes most significantly (called inflection points) are the critical points on the curve 118 because they indicate where there is a change in the amount of change on usability per unit change in password strength, and vice versa.

Accordingly, the password designer can very quickly and easily design a password policy which meets the minimum usability threshold, while still maintaining a high level of security. Said another way, the policy designer can identify the minimal set of password policy constraints which meet the required level of security, thereby avoiding the use of unnecessary policy constraints which greatly reduce usability without a commensurate increase in security.

Figure 3:
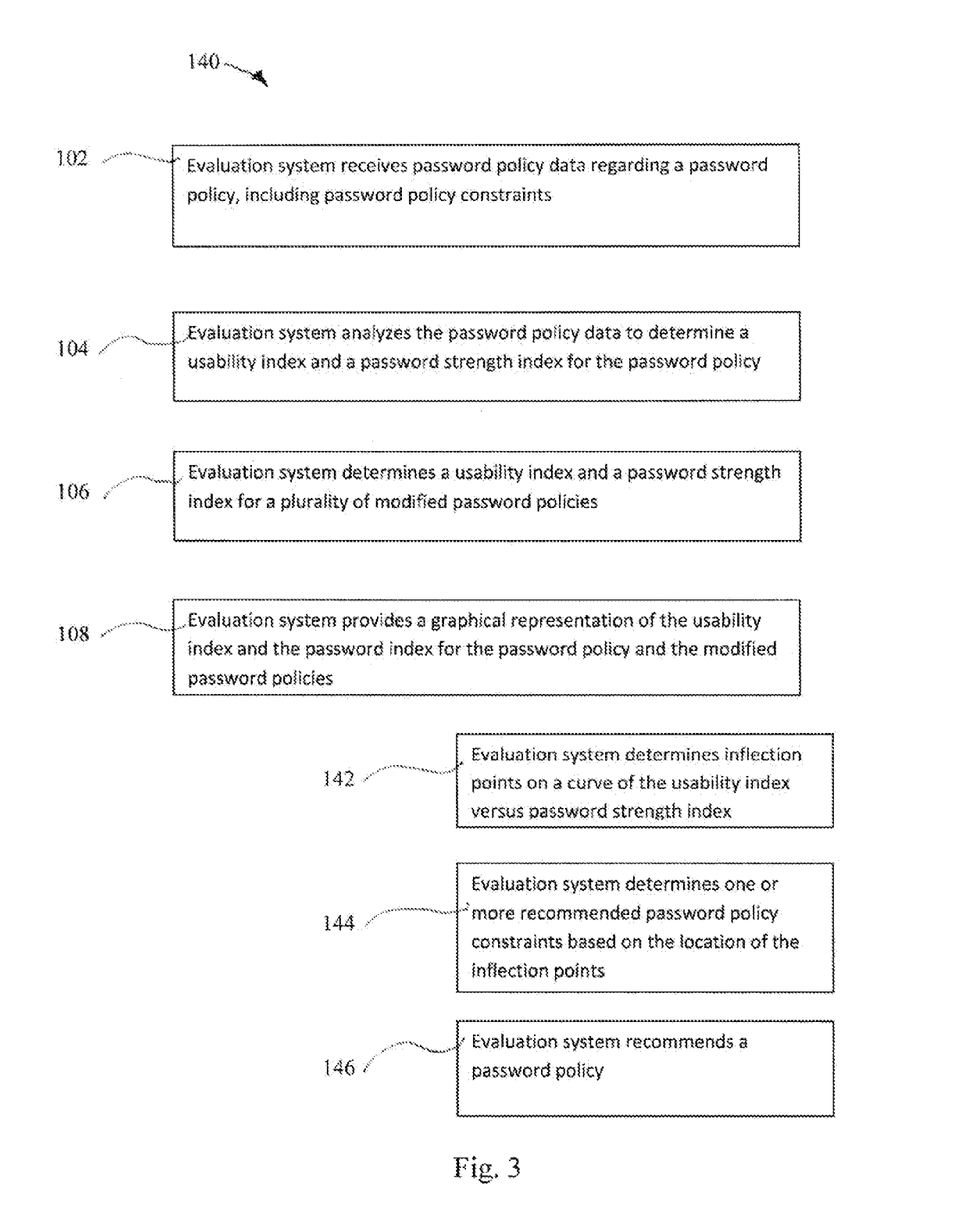
FIG. 3 is a flow chart of a method for evaluating a password policy according to another embodiment of the present invention.

Turning now to FIG. 3, another embodiment of a method for evaluating a password policy is shown as method 140. Method 140 is includes the same steps 102, 104, 106 and 108 described above for method 100, and the description above applies equally for method 140. Method 140 differs from method 100 in that it includes the additional steps for determining and recommending a password policy. At step 142, the method 140 determines the inflection points on the curve of the graph of the usability index versus the password strength index for the user defined password policy and the modified password policies. The evaluation system may use mathematical calculations, such as those based on calculus, and/or other analytical numerical algorithms to determine the inflection points.

At step 144, the evaluation system may also determine one or more recommended password policy constraints based on the location of the inflection points. In one embodiment for step 144, the evaluation system can select various additional modified password policies similar to the password policies near the inflection point (which may be modified or user defined), and then determine the usability index and password strength index of these various password policies. The evaluation system can then analyze the password policies in the vicinity of the inflection point, and choose the password policy having the best trade-off between usability index and password strength index, and also taking into account the usability threshold, if any.

Then at step 146, the evaluation system recommends the recommended password polic(ies) to the user. The recommended password policy can be provided by displaying it on the graphical representation 111 along with its usability index and password strength index, so that the user can compare it to the other password policies displayed on the graphical representation 111.

For example, assume that the evaluation system determines an inflection point between a first password policy having 6 characters and a second password policy having 8 characters, and the inflection point indicates a point on the curve where the slope of the line becomes steeper thereby indicating that the usability is decreasing more per unit of increase in the password strength. At step 144, the evaluation system may determine a recommended password policy having 7 characters. Then, at step 146, the evaluation system displays the recommended password policy on the graphical representation 111.

Figure 4:
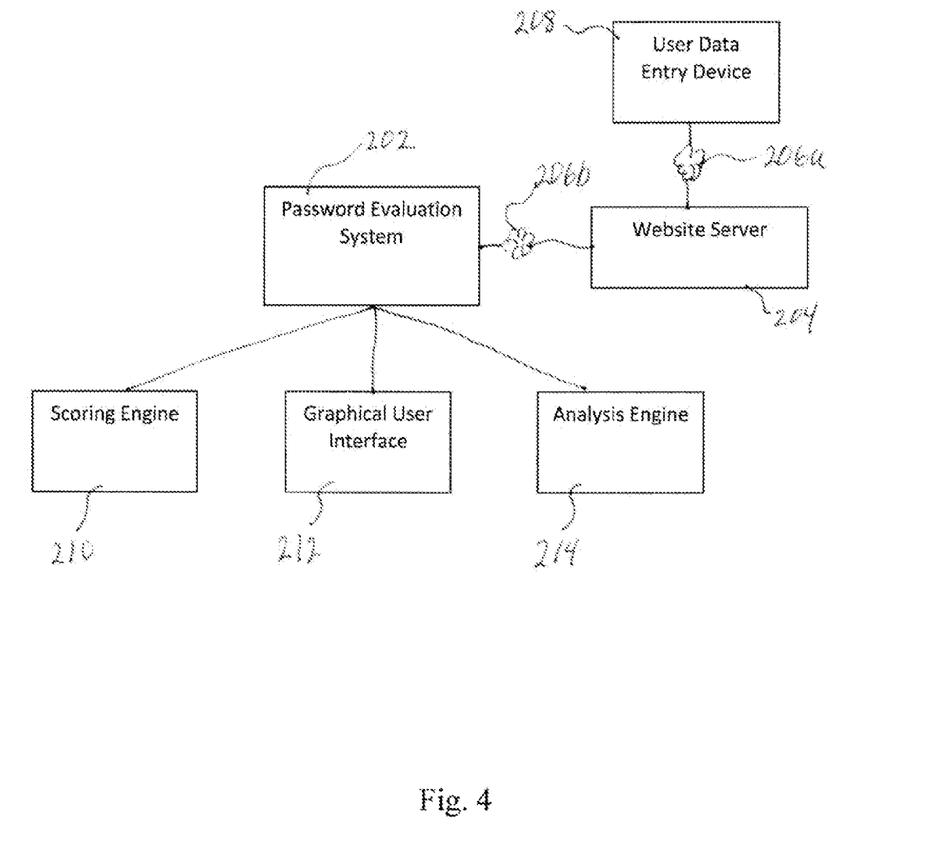
FIG. 4 illustrates an exemplary system for evaluating a password policy according to another embodiment of the present invention.

Referring now to FIG. 4, a non-limiting example of a system 200 is depicted that may be used to implement any of the methods for evaluating a password policy, including methods 100 and 140 described above and any other method embodiments described herein. It should be understood that not all of the components of the system 200 may be needed to implement the methods of the present invention, and therefore, the system may include only those components necessary to perform the method embodiments as described herein.

The system 200 comprises a password evaluation system 202 which includes one or more computers and servers hosting a password evaluation software program. The software application is configured to program the password evaluation system to perform the methods as described herein, such as, (a) receiving from a user, data regarding a password policy, including a password constraint; (b) analyzing the password policy data to determine a usability index and a password strength index for the password policy; (c) determining a usability index and password strength index for a plurality of modified password policies having password constraints different from the password policy; and (d) providing to the user, a graphical representation of the usability index and the password strength for the password policy and the modified password policies. The password evaluation system 202 may include a scoring engine 210, a graphical user interface 212 and an analysis engine 214. The scoring engine 202 is configured to determine a password strength index and usability index for a password policy. The graphical user interface 212 is configured to allow the user to enter user defined password policy constraints and any new proposed constraints, and also to provide the graphical representation of the password policies. The analysis engine 214 is configured to draw best fit curves, compute the inflection points, and determine recommended password policies and threshold usability criteria.

The system 200 may also comprise a website server 204 which may comprise one or more computers, servers and peripherals in operable communication with each other in which at least one of the servers is connected to the internet, such as through communication network 206a. The website server 204 includes pages, files and software programming, such as a system software application, for interacting with a user data entry device 208. The website server provides an interface, through the internet, between the password evaluation system 202 and the user data entry device 208. As examples, the user data entry device 208 may be a computer (such as a personal computer), a handheld web-enabled device, a smartphone, a mobile phone, or other electronic device which can connect to the internet. The website server 204 receives and processes password evaluation data from the password evaluation system 202 through a communication network 206b.

The communication networks 206a and 206b may include a proprietary network, LAN, WAN, cellular network, wireless network, the internet and/or other suitable network, or any combination thereof.

Accordingly, a system 200 is provided which can provide and implement the methods for evaluating a password policy according to the methods 100 and 140, and any other methods described herein.

The methods 100 and 140, as well as any other method embodiments described herein, may also be embodied in, or readable from, a computer-readable medium (computer program carrier), e.g., one or more of the fixed and/or removable data storage data devices and/or data communications devices connected to a computer. The computer program carrier is readable by a computer and embodies instructions executable by the computer to perform the method steps of programming a computer to perform the method 100, or any other method embodiments described herein. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, and DVD-RW.

Although particular embodiments have been shown and described, it is to be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. Accordingly, embodiments are intended to exemplify alternatives, modifications, and equivalents that may fall within the scope of the claims.

What is claimed is:

1. A method for evaluating a password policy, comprising:
    receiving at an evaluation system, from a user, password policy data regarding a password policy, including a password constraint;
    analyzing, by the evaluation system, said password policy data to determine a usability index and a password strength index for said password policy;
    determining, by the evaluation system, a usability index and a password strength index for a plurality of modified password policies having password constraints different from said password policy;
    creating, by the evaluation system, a curve of the usability against the password strength index for said password policy and said modified password policies;
    determining, by the evaluation system, one or more inflection points in said curve where a change in the password strength index has an increased effect on the usability index; and
    providing to the user, a graphical representation of the usability index and the password strength for said password policy and said modified password policies, and providing to the user a recommended password policy constraint based on the one or more inflection points.

2. The method of claim 1, wherein said password constraint includes a minimum number of characters in a password.

3. The method of claim 1, wherein said password constraint includes a number of character classes in a password.

4. The method of claim 1, wherein said step of analyzing at the evaluation system, said password policy to determine a usability index and a password strength index for the password policy, includes analyzing the password policy against a database of usability studies.

5. The method of claim 4, wherein said database of usability studies includes empirical data from usability studies measuring password usability.

6. The method of claim 4, wherein said database of usability studies includes empirical data from usability studies measuring password usability, and theoretical data measuring password usability.

7. The method of claim 1, wherein said graphical representation includes a best fit curve charting the usability index versus the password strength index for said password policy and said modified password policies.

8. The method of claim 1, further comprising the step of:
    determining a usability threshold for a minimum usability index based on an intended use for the password policy.

9. The method of claim 8, wherein the step of determining a usability threshold comprises receiving usability data from the user.

10. The method of claim 9, wherein said usability data comprises information regarding the intended use for the password policy.

11. The method of claim 10, wherein said information comprises information regarding a type of industry for the password, a type of user for the password, and a number of password users under the password policy.

12. A method for evaluating a password policy, comprising:
    receiving at an evaluation system, from a user, password policy data regarding a password policy, including a password constraint;
    analyzing, by the evaluation system, said password policy data to determine a usability index and a password strength index for said password policy;
    determining, by the evaluation system, a usability index and a password strength index for a plurality of modified password policies having password constraints different from said password policy;
    creating, by the evaluation system, a curve of the usability index against the password strength index for said password policy and said modified password policies;
    determining, by the evaluation system, one or more inflection points in said curve where a change in the password strength index has an increased effect on the usability index; and
    providing a recommended password policy constraint to the user based on the step of determining an inflection point.

13. The method of claim 12, wherein said password policy constraint comprises a number of characters for a password.

14. The method of claim 12, wherein said password policy constraint comprises a number of character classes for a password.

15. The method of claim 12, wherein said step of analyzing, by the evaluation system, said password policy data includes analyzing the password policy against a database of usability studies.

16. A system for evaluating a password policy, comprising: at least one computer, said computer configured to perform the following steps:
- receiving password policy data regarding a password policy, including a password constraint;
- analyzing said password policy data to determine a usability index and a password strength index for said password policy;
- determining a usability index and a password strength index for a plurality of modified password policies having password constraints different from said password policy;
- creating a curve of the usability index against the password strength index for said password policy and said modified password policies;
- determining one or more inflection points in said curve where a change in the password strength index has an increased effect on the usability index;
- providing a graphical representation of the usability index and the password strength for said password policy and said modified password policies; and
- providing a recommended password policy constraint based on the one or more inflection points.

17. An article of manufacture comprising a non-transitory computer program carrier readable by a computer and embodying instructions executable by the computer to program a computer to perform the following steps for evaluating a password policy:
- receiving password policy data regarding a password policy, including a password constraint;
- analyzing said password policy data to determine a usability index and a password strength index for said password policy;
- determining a usability index and password strength index for a plurality of modified password policies having password constraints different from said password policy;
- creating a curve of the usability index against the password strength index for said password policy and said modified password policies;
- determining one or more inflection points in said curse where a change in the password strength index has an increased effect on the usability index;
- providing a graphical representation of the usability index and the password strength for said password policy and said modified password policies; and
- providing a recommended password policy constraint based on the one or more inflection points.

* * * * *